Patented Feb. 24, 1931

1,793,942

UNITED STATES PATENT OFFICE

JULIUS LAUX, OF UERDINGEN-ON-THE-NIEDERRHEIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

IRON OXIDE PIGMENT AND PROCESS OF PRODUCING THE SAME AS BY-PRODUCTS OF THE REDUCTION OF AROMATIC NITRO COMPOUNDS

No Drawing. Application filed August 12, 1929, Serial No. 385,458, and in Germany May 8, 1925.

The present invention relates to a process of producing iron oxide pigments; more specifically it relates to a process in which a finely divided iron oxide suitable as a pigment is obtained as a by-product from the reduction of aromatic nitro compounds to the corresponding amines by means of iron and an acid or a solution of inorganic salt exerting an acid reaction due to hydrolysis. The invention also embraces the resulting products.

In the methods of producing aromatic amines from aromatic nitro compounds heretofore known and used for a long time involving the use of iron and an amount of acid insufficient to dissolve the same or a more or less equivalent amount of a solution of a salt exerting an acid reaction due to hydrolysis the iron which is used as the reducing agent generally changes into a brownish black oxide whose composition corresponds to a formula lying between $Fe_3O_4$ and $Fe_2O_3$. This oxide is not useful as a color pigment and is of very inferior quality on account of its slight coloring and covering power.

To illustrate the old process it may be stated that in the manufacture of aniline with every 100 parts by weight of nitrobenzene about 100 parts by weight of iron, 8 to 10 parts by weight of hydrochloric acid (specific gravity 1.16) and about 100 parts of water are used. The reduction is carried out by adding the nitrobenzene and iron to the hydrochloric acid and water heated to about 100° C. at such a rate that the temperature of about 100° C. is maintained due to the heat of reaction. When reduction is finished, the oily layer of aniline is drawn off and the remaining liquid distilled by means of steam after having added some lime, if necessary. The sludge of oxidized iron thus obtained represents a waste product of no commercial value. As is further known, the hydrochloric acid may be substituted by a more or less equivalent amount of sulfuric acid, acetic acid sulfurous acid or the like, or by an equivalent amount of aniline hydrochloride or of a dilute solution i. e. an aqueous solution containing less than 5 per cent of an inorganic salt exerting an acid reaction due to hydrolysis such as ferrous chloride without changing the properties of the resulting iron oxide sludge. It follows from the figures given above that the concentration of hydrochloric acid or aniline hydrochloride in the aqueous phase of the reaction mixture does not essentially exceed 3 per cent or 10 per cent.

According to this invention, the reduction is carried out under such conditions that the aqueous phase of the reaction mixture is a highly concentrated solution of a salt of an organic amino compound and preferably a solution of a salt of the same amine which results from the process itself; that is, the concentration of the aforesaid salt in the aqueous phase should at least amount to 25 percent and should not fall below this amount during the reduction process. This is effected by adding enough of an easily soluble amine salt to the amount of dilute acid (which is less than sufficient to dissolve the iron just as in the old process) or of a dilute solution of an inorganic salt exerting an acid reaction due to hydrolysis required for reduction, so that a solution of the desired high concentration results or, what in practice amounts to the same thing, by dissolving the acid or the inorganic salt undergoing a hydrolysis, as the case may be, in the concentrated aqueous solution of an amine salt instead of in water. The amine salt instead of being added in a ready condition may be produced during the reaction by allowing iron and the acid concentrated solution of a substance which reacts with the amine formed by the reduction thereby yielding a salt of this amine, to react with a nitro compound. Such substances are free acids such as hydrochloric acid, acetic acid, sulfuric acid or those metal salts such as ferrous chloride, aluminum sulfate undergoing a hydrolysis from which a metal hydroxide is precipitated by the amine while the amine combines with the acid of the salt. For example, if nitrobenzene is allowed to react with iron and a limited amount of concentrated hydrochloric acid (i. e. hydrochloric acid of more than 8 percent hydrogen chloride content) insufficient to dissolve the iron, the portions of the aniline which result at first combine with the hydrochloric acid to form a concentrated solution of aniline hydrochloride. Instead of concentrated hydrochloric acid concentrated solutions of other acids such as sulfuric acid or acetic acid may be employed but their concentration should be regulated in such a manner that they contain at least the equivalent amount of acid, or in other words that 1000 parts by weight of concentrated solution contain at least 2 moles of the anhydrous acid or if polybasic acids are used the equivalent fraction thereof. Comparing this process with the old process, it will be seen that the concentration of acid or amine salt is ever more than double that of the old process. The same formation of aniline hydrochloride results if nitro-benzene is treated with iron in the presence of, say, a concentrated ferrous chloride solution; ferrous hydroxide is precipitated from the solution by the aniline which results and there is formed a concentrated solution of aniline hydrochloride which then serves in turn as medium for further reduction.

In all these cases the acid or the inorganic salts exerting an acid reaction due to hydrolysis form a part of the reducing agent and in the first place serve to yield the hydrogen ions necessary for effecting reduction. Therefore I consider the inorganic salts exerting an acid reaction due to hydrolysis to be equivalents of the acids for carrying out this process. For it is always possible to substitute the acid by about the equivalent quantity of its inorganic salt exerting an acid reaction due to hydrolysis that is, for example, every 10 parts by weight of hydrogen chloride may be substituted by about 17 parts by weight of ferrous chloride $FeCl_2$.

If the reduction is carried out in the presence of such a concentrated solution of an easily soluble salt of an organic amino compound pre-formed or resulting during the process (the process—as will be evidenced by the examples set forth—not essentially departing in other respects from the customary processes) there remains after the separation of the aromatic amine, for example, aniline resulting from the nitro compound a slurry which contains the oxidized iron in a most finely divided state and, in fact, in most cases as a deep black ferroso-ferric oxide $Fe_3O_4$. After levigation, washing out and drying, it is useful as a color pigment either directly or, if red shades are desired, after being subjected to a preliminary calcination.

The process is illustrated by the following examples (the parts being by weight). It will be understood that it is capable of being carried out with other nitro compounds than those mentioned in these examples, for instance, with chloro-, hydroxy- and amino-nitro compounds, poly-nitro compounds, and nitro-sulfonic acids. Other easily soluble salts and other acids can be used in place of those named in the examples.

*Example 1*

250 parts of ground iron and 200 parts of nitrobenzene are allowed to run into 160 parts of a 12.5% hydrochloric acid at about 100° C. When reduction is finished, the resulting aniline is separated in the known manner. The iron slurry remaining behind is freed from unattacked iron and from soluble salts by means of levigation and washing out and then dried. It represents a deep black ferroso-ferric oxide, which is converted to a brilliant red iron oxide by calcining it.

*Example 2*

250 parts of ground cast iron turnings are added to 120 parts of a 20% ferrous chloride solution and 200 parts of o-nitrotoluene are allowed to slowly run in at boiling temperature. When reduction is finished, the o-toluidine is obtained in the known manner. The iron slurry remaining behind is freed from unattacked iron and soluble salts by means of levigation and washing out and then dried. It represents a ferroso-ferric oxide of deep black color and high coloring and covering power, which is converted to a bright red iron oxide by calcining it.

*Example 3*

250 parts of finely ground iron, 200 parts of nitrobenzene are allowed to run into 175 parts of a 20% sulfuric acid at about 100° C. When reduction is finished, the resulting aniline is separated in the known manner. The iron slurry remaining behind is purified by levigating, washing out and drying. It then represents a brownish black pigment, which is converted to a bright red iron oxide of yellowish shade by calcining it.

*Example 4*

100 parts of water and 15 parts of glacial acetic acid are heated to about 100° C. and 250 parts of finely ground iron and 200 parts of nitrobenzene are added to the acid in small portions. When reduction is finished, the working up as shown in Example 1 yields a greyish black iron oxide pigment which is converted to a bright red iron oxide by calcining it.

*Example 5*

250 parts of finely ground iron and 200 parts of nitrobenzene are added to a mixture of 85 parts of water and 65 parts of a 40% hydrobromic acid at about 100° C. The working up as shown in Example 1 yields a bluish black ferroso-ferric oxide which is converted to a red iron oxide of violet shade by calcining it.

This is a continuation in part of my co-pending application Serial No. 106,930, filed May 5th, 1926.

I claim:

1. The process which comprises reducing an aromatic nitro compound with metallic iron and an aqueous solution of acid containing at least 2 moles of anhydrous acid in 1000 parts by weight of solution insufficient in amount to dissolve the iron, and separating the resulting iron oxide sludge from the resulting aromatic amino compound, and purifying the former by washing.

2. The process which comprises reducing an aromatic nitro compound with metallic iron and an aqueous solution of acid containing at least 2 moles of anhydrous acid in 1000 parts by weight of solution, and insufficient in amount to dissolve the iron, separating the resulting iron oxide sludge from the resulting aromatic amino compound and purifying the former by levigation, washing out, drying, and calcining.

3. The process which comprises reducing an aromatic nitro compound with metallic iron and an aqueous solution of an inorganic acid containing at least 2 moles of anhydrous acid in 1000 parts by weight of solution and insufficient in amount to dissolve the iron, separating the resulting iron oxide sludge from the resulting aromatic amino compound, and purifying the former by washing.

4. The process which comprises reducing an aromatic nitro compound with metallic iron and a hydrochloric acid solution having a strength of at least 8 percent and insufficient in amount to dissolve the iron, separating the resulting iron, oxide sludge from the resulting aromatic amino compound, and purifying the former by washing.

In testimony whereof, I affix my signature.

JULIUS LAUX.